United States
Thompson

[11] 3,803,511
[45] Apr. 9, 1974

[54] GALLIUM ARSENIDE LASER FIBER COUPLING

[75] Inventor: George Horace Brooke Thompson, Harlow, England

[73] Assignee: International Standard Electric Corporation, New York, N.Y.

[22] Filed: Oct. 18, 1972

[21] Appl. No.: 298,679

[52] U.S. Cl. ............................ 331/94.5, 350/96 WG
[51] Int. Cl. .............................................. H01s 3/02
[58] Field of Search .............. 331/94.5; 350/96, 160

[56] References Cited
UNITED STATES PATENTS
| | | | |
|---|---|---|---|
| 3,697,888 | 10/1972 | Danielmeyer | 331/94.5 |
| 3,725,809 | 4/1973 | Ulrich et al. | 331/94.5 |
| 3,408,131 | 10/1968 | Kapany | 350/96 WG |

Primary Examiner—William L. Sikes
Attorney, Agent, or Firm—John T. O'Halloran; Menotti J. Lombardi, Jr.; Edward Goldberg

[57] ABSTRACT

The coupling of an injection laser diode into an optical fiber is improved by a short resonating length of fiber. A partially reflective layer is positioned at the remote end of the resonator section and a highly reflective layer with an aperture slit and anti-reflection layer in the slit are disposed at the laser end. A circulatory laser mode can also be improved using a resonator section with a matching interference layer at the coupling point. A rectangular contact strip confines current to the desired circulating area. Another variation includes two different coupling points with one more tightly coupled than the other for circulating light in one direction.

10 Claims, 4 Drawing Figures

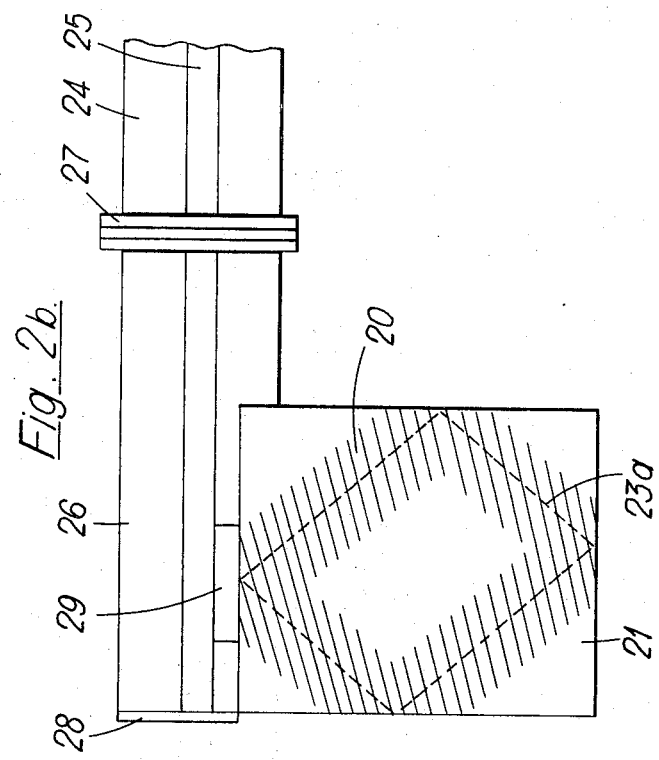
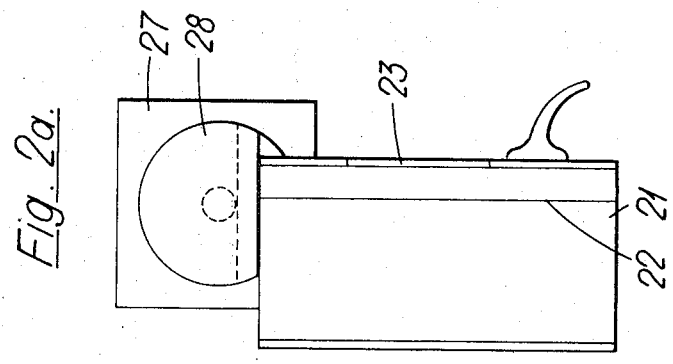

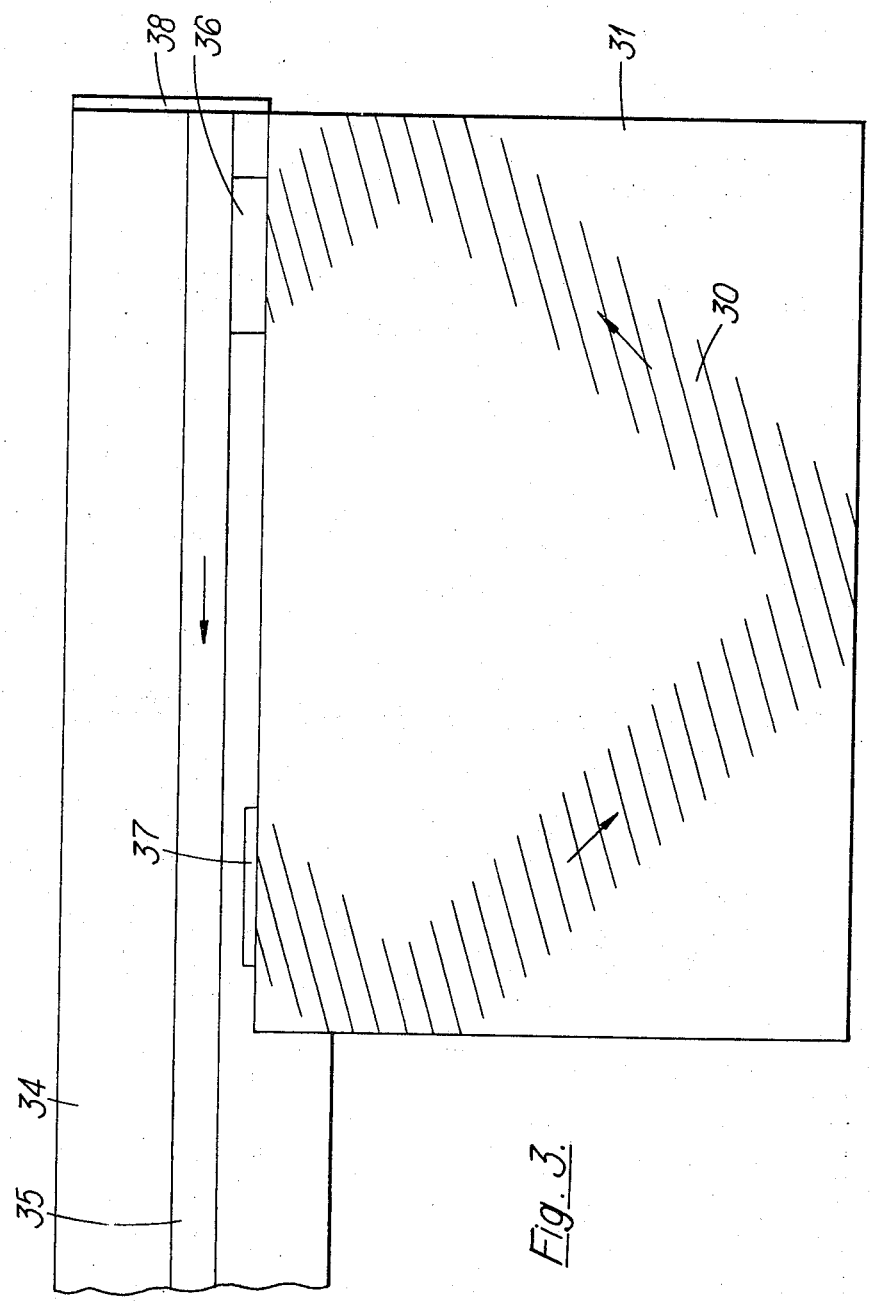

GALLIUM ARSENIDE LASER FIBER COUPLING

BACKGROUND OF THE INVENTION

1. Field of the Invention

This invention relates to optical coupling arrangements for achieving optical coupling between optical fibers and semiconductor lasers and particularly to an improved coupling which employs a short resonating length of fiber.

2. Description of the Prior Art

Previous couplings between semiconductor lasers and optical fibers have utilized butt joints between the flat output face of the laser and the open end of the fiber which includes a core region surrounded by cladding. A more recent improvement is described in co-pending Application now U.S. Pat. No. 3,760,297, issued Sept. 18, 1973 and assigned to the same assignee as the instant application. In that case the laser is employed in a circulatory mode in which one side is coupled to the side of the optical fiber.

SUMMARY OF THE INVENTION

It is the primary object of the present invention to provide an improved coupling arrangement which achieves greater efficiency for launching light from a semiconductor laser into an optical fiber.

According to the present invention this is obtained by an optical coupling arrangement including a semiconductor laser coupled to a short resonating length of optical fiber in such a way that a laser resonant cavity is formed which includes a portion of the optical fiber.

Embodiments of the invention will now be described with reference to the accompanying drawings.

BRIEF DESCRIPTION OF THE DRAWINGS

FIGS. 2a and 2b depict respectively an end view and a sectioned side view (sectioned in the plane of the p-n junction) of a coupling arrangement employing a circulatory mode injection laser, and FIG. 3 depicts a sectioned side view (sectioned in the plane of the p-n junction) of an alternative coupling arrangement also employing a circulatory mode injection laser.

DESCRIPTION OF THE PREFERRED EMBODIMENTS

Figure 1:
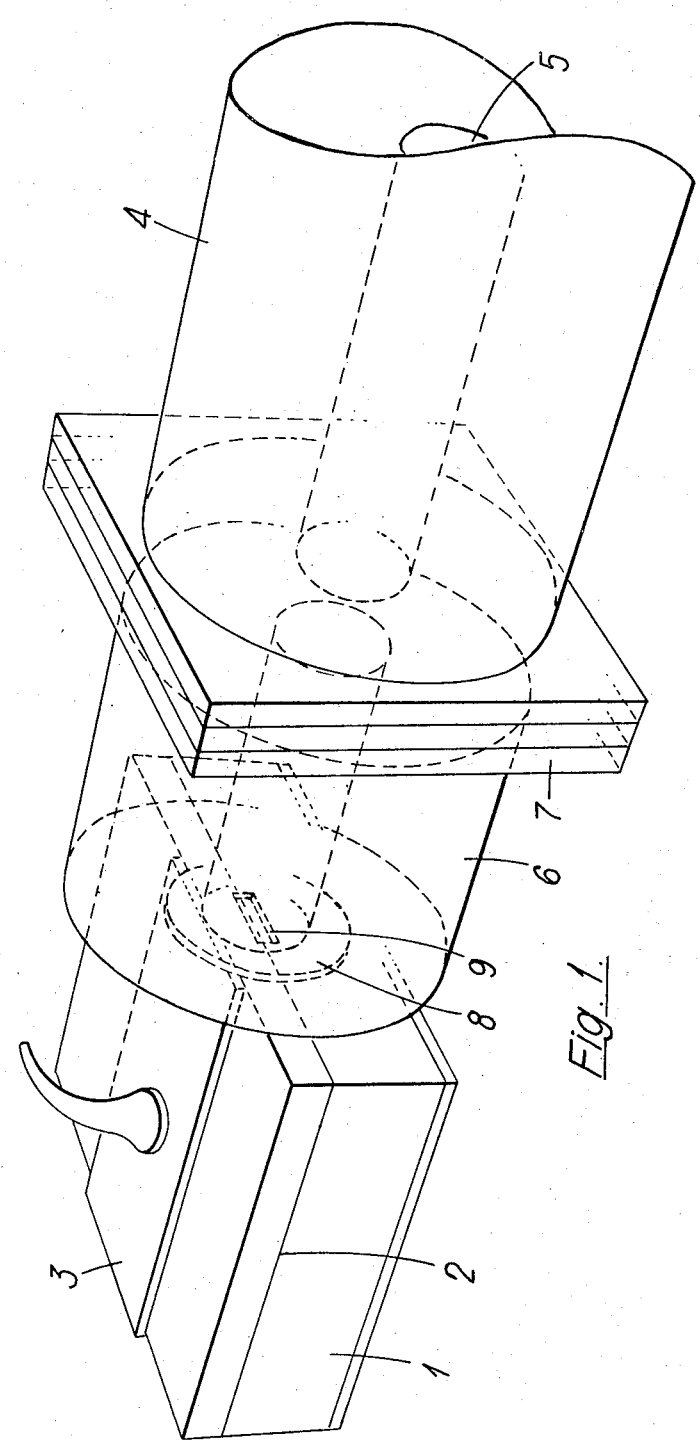
FIG. 1 depicts a perspective view of the novel coupling arrangement employing a Fabry Perot mode injection laser.

An embodiment employing the invention with a conventional Fabry Perot mode type double heterostructure Gallium Arsenide-Gallium Aluminum Arsenide injection laser is depicted in FIG. 1. In this figure the laser is depicted at 1 with a p-n junction region at 2. The cross-sectional area of excitation of this junction region is confined to a narrow strip by the action of a stripe contact 3. The output optical fiber is indicated generally at 4, and its core at 5. A portion 6 of this optical fiber is formed into a resonator by interposing a partially reflecting surface 7 between it and the remainder of the fiber, and by providing a highly reflecting surface 8 at its other end. The partially reflecting surface 7 is a multilayer dielectric reflector, while the reflecting surface 8 is conveniently metallic. This metallic reflector 8 is provided with a small slit aperture 9 which registers with, and corresponds in size and shape to, the laser light output from the laser 1. In this aperture 9 is located a dielectric anti-reflection layer.

The 'free' radiation, that is to say the radiation not guided by the fiber, which is radiated from this aperture is less than that which would have occurred had the optical fiber been directly butted against the laser without the use of the intermediate resonator section 6. In other words the use of the resonator section 6 improves the launching efficiency into the fiber. This results because the resonator produces free radiation in antiphase with that from the laser and partially cancels it out. The behaviour can be described in terms of the principle that the perturbation produced by a hole in a reflecting surface on the total reflection from that surface has the same directional characteristics as the transmitted radiation through the hole when a wave is incident from the opposite side. This allows the making of the following deductions about the coupling and reflection coefficients at the boundary.

Let the ratio of the amplitude of free radiation to that of the guided wave be $\alpha$. Then if the coupling coefficient to the guide is $t$, the coupling coefficient to free radiation is $\alpha t$. Similarly, by the principle above if the reflection coefficient of a guided wave incident back on the laser coupling is $-1 + \beta$ (the reflection coefficient of the metallized surface without a coupling slit would be $-1$) the coupling coefficient to free radiation is $\alpha\beta$. To find the relative contributions to free radiation from the wave in the laser and the returning wave in the resonator it is necessary to obtain their relative magnitudes.

For the special case of a totally reflecting surface at the output of the resonator the only energy loss is at the input and the contribution from the laser to keep the resonator oscillating is equal to the "missing" portion $\beta$ of total reflection. Hence the ratio of the amplitude of the wave in the resonator to the forward going laser wave is $t/\beta$, and the laser and the resonator provide equal amplitudes of free radiation. Since the returning wave in the resonator is in anti-phase with that from the laser, so also are the two contributions to free radiation, and they therefore cancel out. For the practical case where the resonator has a finite output coupling which reduces its Q from the unloaded value of $Q_o$ to the loaded value of $Q_L$, the amount of energy radiated into the output is proportional to $(1 - Q_L/Q_o)$ and the amount radiated into space is proportional to $(1 - (Q_L/Q_o)^{1/2})^2$, the latter being in the form of the square of the difference between two amplitudes. The ratio of radiated to guided power is therefore reduced by the resonator by the factor.

$$(1 - (Q_L/Q_o)^{1/2})/(1 + (Q_L/Q_o)^{1/2})$$

For the device to work effectively the output from the laser should be in tune with the resonator. Several requirements should be satisfied. Firstly there must be a laser resonance within the bandwidth of the resonator or vice versa. Hence, to avoid special tuning, the optical length of the resonator should be either a small fraction of that of the laser or a considerable multiple. Secondly, there should be a pulling effect which tends to favor those laser modes which are in tune with the resonator. This can be provided by using an antireflection coating on the laser output face adjacent the resonator. This inhibits reflection in the off-resonator condition. The feedback necessary for laser operation then only occurs at resonance. Thirdly, for the case where the resonator has a shorter optical length than the laser, some method is required for tuning laser gain to one of the responses of the resonator. This can be done by adjusting the temperature, less than 20° C variation being required even in the least favorable case. The use of a resonator having a longer optical length than the laser obviates this last problem because its resonances are more closely spaced. On the other hand it will have a higher Q which will slow the rate of response hence limiting the bandwidth.

The invention is not restricted in its application solely to coupling arrangements involving lasers resonating in Fabry Perot modes. FIGS. 2a and 2b depict alternative views of an embodiment involving the use of a circulatory mode laser. This coupling arrangement has many features in common with coupling arrangements described in the specification accompanying the aforementioned co-pending patent application to which attention is directed. In FIGS. 2a and 2b a double heterostructure GaAs-GaAlAs laser chip is represented at 21. The chip has two pairs of cleaved edges which define a rectangularly shaped p-n junction 22. The excitation of Fabry Perot modes between opposite pairs of cleaved edges is prevented by means of a specially shaped contact 23 which serves to confine the current through the p-n junction to the shaded region 20 in FIG. 2b. The remaining parts of the p-n junction are 'passive' and hence optically absorbing. The contact 23 may be thought of as composed of four strip contacts laid along the four sides of a parallelogram 23a whose vertices meet in the edges of the chip and whose sides are parallel to the diagonals of the chip. It will be observed that adjacent edges of this parallelogram are equally inclined to the edges of the laser chip in which they meet. Hence the 'active' region of the p-n junction, the region to which current flow is confined, enables the formation of a circulatory laser mode in which one total internal reflection is made at each of the four cleaved edges.

An optical fiber 24, with its core at 25, is positioned along one of the cleaved edges with its axis in line with the p-n junction. The 'aspect ratio' of the laser, that is to say the ratio of length to breadth of the rectangularly shaped p-n junction, is chosen so that the circulating light is incident at the edge adjacent the fiber at just the right angle for launching into the optical fiber core 25. A portion 26 of the optical fiber is formed into a resonator by interposing a partially reflecting surface 27 between it and the remainder of the fiber, and by providing a highly reflecting surface 28 at its other end. The partially reflecting surface 27 is a multilayer dielectric reflector, while the reflecting surface 28 is conveniently metallic.

By virtue of the optical coupling between the portion 26 of optical fiber and the laser chip 21, the portion 26 forms part of a laser resonant cavity. In this resonant cavity light circulating clockwise in the laser chip is launched into the fiber, is reflected by the partially reflecting surface 27, and returns to the laser chip, where it couples back into the semiconductor material to circulate counter-clockwise before being relaunched into the fiber again. This time the light is reflected by the reflecting surface 28, and returns again to the laser chip thus completing the circuit. In order to optimize the optical coupling, a refractive index matching interference layer 29 is interposed between the fiber core 25 and the laser chip in the neighborhood of the active region of the p-n junction. A three-quarter wavelength layer is used in preference to a quarter wavelength layer as this provides a greater separation between the fiber core and the passive regions of the p-n junction. If the core is brought too close efficiency is impaired because there is a not insignificant coupling of power from the fiber into these passive regions where power would be absorbed.

With this coupling arrangement the resonating of a short section of the output fiber serves to reduce the radiation losses at the point of coupling between a ring laser and a fiber in the same way as at the point of coupling with a Fabry Perot laser. The cancellation of the free radiation is similar in principle to that with the Fabry Perot laser but somewhat more complicated in details since modes of both clockwise and counter-clockwise circulation in the laser chip must be taken into account. Unless there is some reflection at the output the counter-clockwise mode in the laser would idle at an intensity not far above noise level. However the feedback from the highly reflecting mirrors 27 and 28 will bring it up to almost the intensity of the clockwise mode. It feeds its output towards the end of the fiber with the metallic reflector.

The reflection of this wave interacts with the coupling region to reduce the free radiation from the clockwise mode and, vice versa, the reflection of the outgoing wave reduces the free radiation from the counter-clockwise mode. On account of the interaction of the feed from two modes in a single fiber resonator it can be shown that for a given degree of radiation suppression the reflection coefficient required from the multilayer dielectric mirror is reduced below that required for the Fabry Perot laser, being approximately the square of the latter value.

An alternative way of incorporating a portion of the output optical fiber into the resonant cavity of a circulatory mode laser is to be found in the coupling arrangement depicted in FIG. 3. The principle feature of this arrangement is that light is coupled from the semiconductor material into the fiber at one place which is at a distance from the place where light is coupled back into the semiconductor material. In this figure a double heterostructure GaAs GaAlAs semiconductor chip is depicted at 31 and the output fiber guide at 34 with its core at 35. The sides of the chip are cleaved in the same manner as those of the chip employed in the coupling arrangement described with reference to FIGS. 2a and 2b. Current flow across the p-n junction of the chip 31 is not uniform but is confined by means of a specially shaped contact (not shown) to the shaded region 30. This region 30 is a truncated form of the corresponding region 20 of the arrangement described above with reference to FIG. 2. Light circulating counter-clockwise in the plane of the p-n junction is reflected at three of the cleaved sides of the chip before arriving at the correct angle for launching into the fiber near its right-hand end. Here a refractive index matching interference layer 36 is interposed between the chip 31 and the core 35 to optimize the coupling.

The light which is launched propagates a short distance along the fiber before it reaches the neighborhood of a second refractive index matching interference layer 37. This layer 37 provides a much smaller amount of optical coupling so that only a small fraction of the power is abstracted, this fraction being just enough to provide sufficient feedback to ensure laser action. The difference between the coupling strengths of the two layers 36 and 37 is achieved by making the layer 36 a three-quarter-wavelength layer sandwiched directly between the chip and the core, while the layer 37 is made thinner (approximately ¼λ) so that the coupling is lessened by a residual amount of cladding separating this layer from the core. The coupling provided by layer 36 is therefore nearly total, while that provided by layer 37 is considerably less. The degree of coupling provided by layer 37 may be further reduced if necessary either by making the layer not exactly a quarter wavelength optical thickness, or by choosing to construct it of a material whose refractive index is not exactly equal to the value required for perfect matching. It should be noted that where thickness has been quoted in terms of wavelengths this is to be understood as the corrected thickness taking into account the obliquity factor necessary to compensate for the light not being incident at normal incidence.

In this coupling arrangement the dimensions of the chip are chosen so that any light which is circulating in the chip in a counter-clockwise direction is efficiently launched into the fiber. The presence of the matching layer 36 reduces to a minimum the amount of light reflected at the interface beneath this layer, and any light which is reflected is absorbed because it will be entering a passive region of the p-n junction, where there is substantially no current. On the other hand the light which is launched into the fiber is able to propagate along the fiber, only a small proportion of it being coupled back into the laser chip the region of the p-n junction underlying the matching layer 37.

In this way the laser is automatically limited to those modes which, when launched into the core of the fiber, produce a direction of propagation lying somewhere between a glancing angle and the critical angle at the fiber cladding interface. A particular angle within this range may be favored either by optimizing the coupling for that angle by suitable choice of composition and thickness of the matching layers, or by the geometry of the fiber with respect to the input and output coupling regions, or by providing a relatively long 'drift' region between the two coupling regions so that the true mode of the fiber, with its particular angle of propagation, can establish itself at the expense of false leaky modes.

If a clockwise circulation mode is set up most of its power will be reflected back into the passive region of the p-n junction by the matching layer 37 where the optical coupling is not particularly tight. To ensure that the power in this mode represents a small proportion of the total power, a reflecting surface 38 is provided at the end of the fiber. Provided that some fraction of the power in the clockwise circulating mode is able to leak down the fiber past the matching layer 36, this reflecting surface ensures that there is considerably more coupling from the unwanted clockwise circulating mode into the wanted counterclockwise circulating mode than vice versa.

The first of the two above described coupling arrangements involving the use of circulatory mode lasers require the exercise of great precision in their cleaving in order to get the requisite width to breadth ratio (aspect ratio), for making the light incident at the correct angle for launching into the fiber. A way of relaxing the degree of precision required involves adopting a construction in which the circulatory mode of the laser is made to include passage through a portion of lower refractive index in which a reflection is made at near grazing incidence. Preferably an anti-reflection layer is interposed between this region of lower refractive index and the rest of the laser in order to minimize optical loss at this interface. The portion of lower refractive index may conveniently take the form of a short length of optical fiber sectioned along its axis through a diameter. This half-cylindrical piece of sectioned fiber is placed with its flat surface against one side of the semiconductor material so that its core is in line with the p-n junction. A more detailed explanation of this use of a portion of lower refractive index, and in particular of this use of a sectioned optical fiber, is to be found in the specification accompanying our referenced co-pending patent application to which attention has already been directed.

It is to be understood that the foregoing description of specific examples of this invention is made by way of example only and is not to be considered as a limitation on its scope.

What is claimed is:

1. An optical coupling arrangement comprising a semiconductor laser having two opposite rectangular faces and four adjoining reflecting side walls, a p-n junction region extending parallel to said faces and having edges along said side walls, and an optical fiber having a longitudinal resonator portion coupled to one of said side walls at said p-n junction region to receive output from said laser, said portion having reflective surfaces at opposite ends and being of a sufficient length such that a laser resonant cavity is formed which includes said portion of said optical fiber, the resonator portion being in tune with output from said laser.

2. The arrangement as claimed in claim 1 wherein said portion of optical fiber includes a partially reflecting surface at one end spaced from said laser and a highly reflecting surface at the opposite end adjacent said laser.

3. The arrangement as claimed in claim 2 wherein said laser is butt-coupled to said opposite end of said portion of said fiber through said highly reflecting surface, said highly reflecting surface including a slit interposed between said opposite end portion of said fiber and said laser.

4. The arrangement as claimed in claim 3 wherein said slit includes an anti-reflection interference layer.

5. The arrangement as claimed in claim 2 wherein said laser is adapted to lase in a circulatory mode between said side walls within said junction along a rectangular path having respective reflection points intermediate each of said side walls, said portion of optical fiber being attached along one side of said laser at a lengthwise position on said fiber intermediate said end surfaces so as to effect optical coupling with said laser at a reflection point.

6. The arrangement as claimed in claim 5 wherein said fiber includes an inner core and outer cladding, and a refractive index matching interference layer is interposed between said bore and the adjacent one side of said laser, said layer extending along a portion of said one side at a reflection point.

7. The arrangement as claimed in claim 6 wherein said layer is a three-quarter wavelength layer.

8. The arrangement as claimed in claim 6 including a second refractive index matching interference layer between said core and one side spaced further along said fiber from the first layer and from said highly reflecting surface, said second layer being more loosely coupled between said core and laser than said first layer.

9. The arrangement as claimed in claim 2 wherein the p-n junction region is of gallium arsenide.

10. The arrangement as claimed in claim 2 wherein the laser is of a Gallium Arsenide-Gallium Aluminum Arsenide double heterostructure.

* * * * *

UNITED STATES PATENT OFFICE
CERTIFICATE OF CORRECTION

Patent No. 3,803,511                           Dated April 9, 1974

Inventor(s) George H. B. Thompson

It is certified that error appears in the above-identified patent and that said Letters Patent are hereby corrected as shown below:

On the Title page, insert --

[32]  Priority October 28, 1971

[33]      Great Britain

[31]      50081/71

Signed and sealed this 17th day of September 1974.

(SEAL)
Attest:

McCOY M. GIBSON JR.                C. MARSHALL DANN
Attesting Officer                 Commissioner of Patents